United States Patent [19]

Kai et al.

[11] 4,308,429
[45] Dec. 29, 1981

[54] MOBILE TELEPHONE CHANNEL EXCHANGE SYSTEM

[75] Inventors: Tomokazu Kai; Yoshio Sato, both of Tokyo, Japan

[73] Assignee: Nippon Electric Co., Ltd., Tokyo, Japan

[21] Appl. No.: 68,782

[22] Filed: Aug. 22, 1979

[30] Foreign Application Priority Data

Aug. 25, 1978 [JP] Japan ............................. 53-102877

[51] Int. Cl.³ .............................................. H04Q 7/04
[52] U.S. Cl. .................................. 179/2 EB; 455/33; 455/56
[58] Field of Search .................. 179/2 EB; 455/53, 54, 455/56, 33

[56] References Cited

U.S. PATENT DOCUMENTS 4,144,412  3/1979  Ito et al. ............................ 179/2 EB

FOREIGN PATENT DOCUMENTS 2351563  4/1975  Fed. Rep. of Germany ... 179/2 EB
1443666  7/1976  United Kingdom ............. 179/2 EB

*Primary Examiner*—Bernard Konick
*Assistant Examiner*—J. A. Popek
*Attorney, Agent, or Firm*—Sughrue, Mion, Zinn, Macpeak and Seas

[57] ABSTRACT

A mobile telephone communication system is provided with a plurality of mobile units having a transmitter-receiver capable of being tuned to a plurality of radio channels. A plurality of base stations are provided with receivers capable of detecting carrier level drop-off and a control station is operable to command the given base station to transmit an instruction to the mobile unit commanding it to transmit its signal over a channel which is common to all of the base stations. The control station is then operable to detect an increased carrier level in a zone corresponding to a second base station, and to instruct each of the base stations to transmit a signal over the common channel commanding the mobile unit to switch channels to an idle channel corresponding to a second base station.

1 Claim, 8 Drawing Figures

SYSTEM DIAGRAM

SYSTEM DIAGRAM

ALL CHANNEL FIELD STRENGTH RECEIVER

MOBILE CONTROL STATION

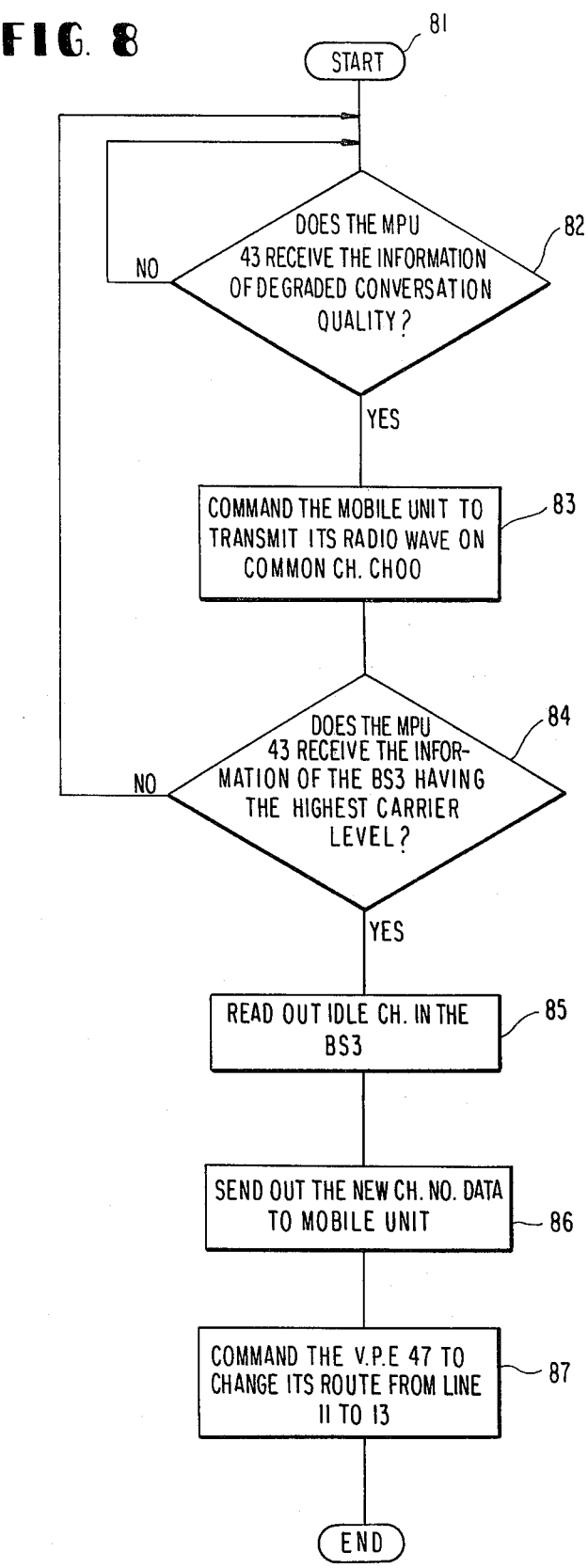

MOBILE TELEPHONE CHANNEL EXCHANGE SYSTEM

BACKGROUND OF THE INVENTION

This invention relates to mobile telephone communication systems using so-called small radio zone techniques, and more particularly to channel exchange systems in such communication systems.

In a mobile telephone communication system of this kind (for example that of U.S. Pat. Nos. 4,144,409, U.S. Pat. No. 4,144,496 or U.S. Pat. 3,898,390), the service area is divided into many small radio zones, in each of which is established a base station. More than 2 such small zones constitute a control zone, in which is set up a mobile control station, which in turn is connected to the ordinary telephone service network. Between the ordinary telephone service network and the mobile control station is provided a mobile telephone center having the function of converting the signals used in the radio section into the form of signals used in the existing exchange network. However, such mobile telephone centers are sometimes installed in exchange stations housing switchboards for the ordinary telephone service network as well.

Since the service area of such mobile telephone communication system, as stated above, is divided into a large number of small zones, a mobile unit may move from one small zone to another in the course of the same conversation. In such an instance, it is necessary to avoid interruption of the conversation when the mobile unit passes the boundary between zones by switching from the speech channel of the first zone to that of the second zone. This channel switching, by prior art, is accomplished in the following manner: the crossing of the boundary between zones by a mobile unit in the course of a conversation is detected by the level detecting circuit of the speech channel receiver at the base station, sensing a drop in received carrier wave level below the predetermined level; and the level degradation signal is transmitted to the mobile control station, which, upon receipt of this signal, transmits level monitoring demand signals to base stations around the base station whose signal level has degraded; each base station having received this demand signal switches its level monitoring receiver to the speech channel designated by the demand, monitors the received carrier level and reports the result of monitoring to the mobile control station, which, comparing these level data from the radio base stations, selects the station having the maximum level and assigns a new channel; after the selection of the new channel, a channel exchange instruction signal is transmitted to the mobile unit through the channel hitherto used for the conversation; and the mobile unit, assigned a new channel, switches over to this new channel and continues the conversation thereon. For further details on such systems, reference is made to Kamata et al., "800 MHz Band Land Mobile Telephone Radio System," and Nagatsu et al., "Base Station Radio Equipment for 800 MHz Band Land Mobile Telephone System," both of *Review of the Electrical Communication Laboratories Nippon Telegraph and Telephone Public Corporation*, Volume 25, Numbers 11-12, November-December, 1977.

Such a channel exchange system has a disadvantage in that the mobile unit may erroneously receive the channel exchange instruction signal and interrupt the conversation, because the instruction signal is transmitted over the previous speech channel on which the received voltage level has already degraded. Furthermore, each base station would require a carrier level monitoring receiver which can tune in to every speech channel at the disposal of surrounding radio base stations, and such carrier level monitoring receivers are expensive and therefore undesirable.

Accordingly, the objective of the present invention is to provide a highly reliable and moreover relatively inexpensive mobile telephone channel exchange system which is free from the disadvantages stated above.

SUMMARY OF THE INVENTION

In accordance with this invention, there is provided, a mobile telephone channel exchange system comprising a mobile unit or units each having a first transmitter-receiver capable of being tuned in any given radio channel; a plurality of base stations having a group of transmitters each corresponding to one of a plurality of radio channels, and a group of receivers each provided with a means for detecting any drop in received carrier level below a predetermined value and corresponding to one of said plural radio channels, and small zones; a telephone exchange connected to ordinary telephone subscribers, and a mobile control station connected between the plurality of base stations and the telephone exchange for controlling telephone circuits, for switching over from a first radio channel of a first of the base stations to a second radio channel which is one of the idle channels of a second of the base stations when any of the mobile units, while having conversation on the first radio channel, moves from the small zone of the first radio base station to the second base station, characterized in that each of the plural base stations includes a second transmitter-receiver corresponding to a common ratio channel separate from the radio channels of the plurality of base stations, means responsive to a first exchange instruction signal for switching over from the first radio channel to the common radio channel; and means responsive to a second exchange instruction signal for switching over from the first radio channel to the second radio channel, and that the mobile control station includes means for producing the first exchange instruction signal in response to the output of the detecting means; means for comparing the carrier levels transferred from the mobile unit received by a second group of receivers of said plurality of base stations to select out of the idle channels of the second base station the second radio channel having the highest level and produce the second exchange instruction signal corresponding to the second radio channel; means responsive to the second exchange instruction signal for switching over the telephone circuit from the first radio channel circuit to the second radio channel circuit, and means for transmitting the first and second exchange instruction signal to the mobile unit by way of the second group of transmitters.

These and other features of this invention will become more apparent by reference to the following description taken in conjunction with the accompanying drawing:

BRIEF DESCRIPTION OF THE DRAWINGS

FIG. 8 is a flow diagram showing channel exchanging operations of a microprocessor in the mobile control station shown in FIG. 7.

FIG. 1 illustrates a small zone system in which small zones $Z(1)$, $Z(2)$ and $Z(3)$ are respectively assigned to base station 1, 2 and 3. In the figure, a mobile telephone center having a signal from converting function is installed in an exchange station 6 of the ordinary telephone network. The small zones $Z(1)$ through $Z(3)$ are limited to the effective coverages of radio waves from the base stations 1 through 3, respectively, and a mobile unit 4 is located either in one of these individual small zones or where they overlap each other. The mobile unit 4 is radio-linked to one of the base stations 1 through 3; the base station 1, 2 or 3 is connected to a mobile control station 5 either by wired or wireless link, and the mobile control station 5 is linked to the exchange station 6 to which a ordinary telephone subscriber 7 or mobile subscriber except the mobile unit 4 is connected. When the mobile unit 4, maintaining conversation, moves from the small zone $Z(1)$ to the small zone $Z(3)$, the radio wave from the mobile unit 4 to the base station 1 weakens to hamper the continuation of the conversation in satisfactory quality. Therefore, a speech channel has to be switched over from that of the base station 1 to that of the base station 3 to continue the conversation. In switching over the speech channel, first of all the mobile control station 5 has to know into what small zone the mobile unit 4 has moved from the zone $Z(1)$. The control station 5 identifies by the following procedure, on the basis of monitor signals from the base station 1, 2 and 3, the small zone to which the mobile unit 4 has moved. The base station (common for 1 through 3) illustrated in FIG. 2 has an antenna 21, a transmitter-receiver duplexer 22, a transmitting multiplexer 23, a receiving multiplexer 24, a group of transmitters $TX_{1i}$-$TX_{ni}$ (i=1-3, n is a natural number), a group of receivers $RX_{1i}$-$RX_{ni}$ and a received carrier level measuring receiver $SRX_i$. The numbers of transmitters and receivers in the groups of transmitters and receivers $TX_{1i}$-$TX_{ni}$ and $RX_{1i}$-$RX_{ni}$, respectively, are equal to n, the number of speech channels in proportion to traffic. The received carrier level measuring receiver $SRX_i$ is capable of measuring the received carrier level of every speech channel in the system. The connecting lines $2_{1i}$-$2_{ni}$ and $3_{1i}$-$3_{ni}$ respectively correspond to the speech channels 1 through n and $3_{oi}$ is a common control line. Supposing that the mobile unit 4 is holding conversation over the speech channel (denominated channel (CH11) of a transmitter $TX_{11}$ and a receiver $RX_{11}$ of the small zone $Z(1)$, the quality of conversation will degrade as the mobile unit 4 moves from the small zone $Z(1)$ to the small zone $Z(3)$. When the quality of convention degrades below the predetermined threshold level, the receiver $RX_{11}$ informs the mobile control station 5 of this degradation. Informed of this degradation in conversation quality, the mobile control station 5 instructs the received carrier level measuring receivers $SRX_1$-$SRX_3$ of the base station 1 and other base stations around it (the base stations 2 and 3 in this example), respectively, to tune in to the channel CH11. The specific structure of the received carrier level measuring receiver $SRX_i$ is illustrated in FIG. 3. A channel assignment signal from the mobile control station is supplied to a channel assigning and logic unit 33 through the common control line $3_{oi}$. In conformity with this signal, the channel assigning and logic unit 33 controls a frequency synthesizer 32 to equalize the receiving frequency of a receiver unit 31 to the channel CH11. The receiver unit 31 of each of the base stations 1-3, whose receiving frequency has been tuned in this manner, converts the received carrier level from the mobile unit into the parallel digital signal with an analog/digital converter 34. This parallel digital signal, after being further converted in the channel assigning and logic unit 33 into a serial digital signal, is transmitted through the common control line $3_{oi}$ to the mobile control station as a monitor signal for channel switching. The mobile control station having received the monitor signal from each base station effects the following operations.

Figure 1:
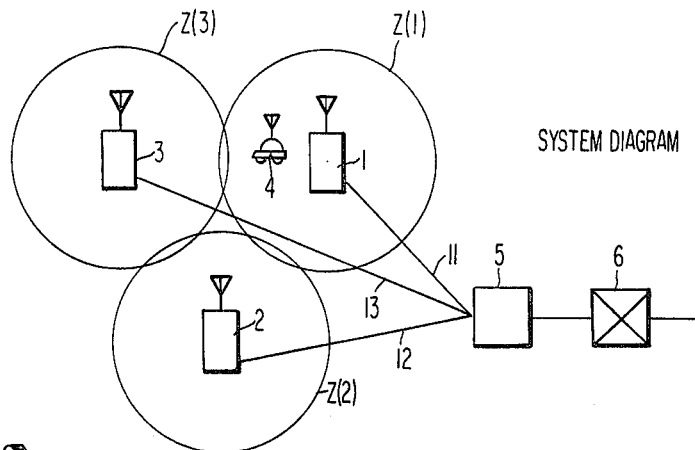
FIG. 1 illustrates a schematic diagram of the mobile telephone communication system relating to this invention.
Figure 4:
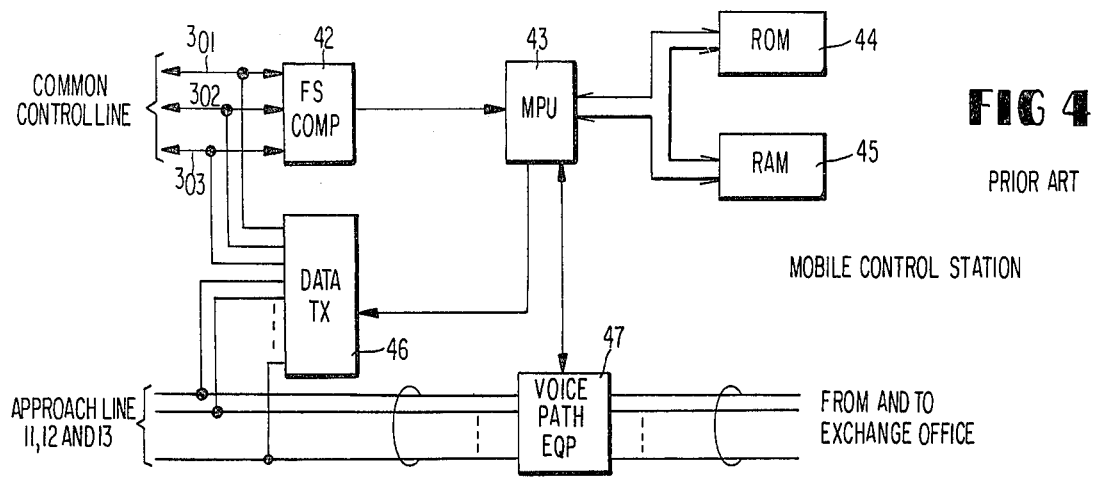
FIG. 4 is a block diagram of conventional mobile control station.
Figure 7:
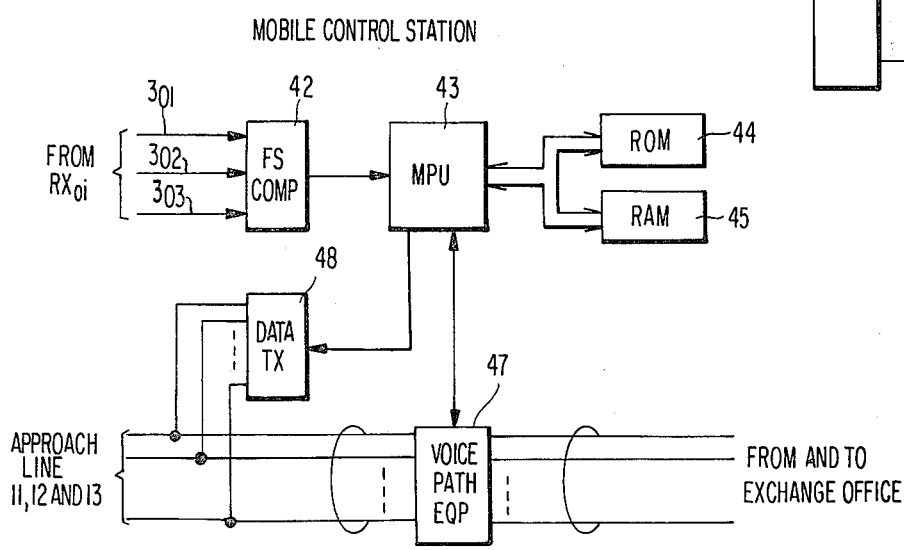
FIG. 7 is a block diagram of a mobile control station according to this invention.

The mobile control station is structured as illustrated in FIG. 4. The monitor signal from each base station is supplied through the common control line $3_{oi}$ to a field strength comparator 42, which compares the field strengths of the monitor signals, selects the base station from which the strongest signal has come and informs a microprocessor 43 of the selection it has made. The microprocessor 43, ROM44 and RAM45, illustrated in both FIGS. 4 and 7, can be constituted by a single chip microcomputer, known as the TMS9940. For details of this unit, the reader is referred to the publication "TMS9940 Single Chip Microcomputer" presented by John D. Bryant et al at Electro '77, published by Texas Instruments Incorporated. In response to this information, the microprocessor 43 searches for in and reads out a random access memory (RAM)45, in accordance with the program of a read only memory (ROM)44, an idle channel out of the channels allocated for that small zone giving the highest field intensify. In the example illustrated in FIG. 1, the control station 5 can recognize, from the highest field intensify, that the mobile unit 4 has moved to the small zone $Z(3)$ and, based on this recognition, the microprocessor 43 selects an idle channel (a channel CH31 for instance) in the small zone $Z(3)$ stored in the RAM 45 and informs the mobile unit of its channel number from a data transmitter 46 by way of the channel CH11 over which conversation has taken place. At the same time, voice path equipment 47 is given an instruction to replace the approach line 11 of the base station 1 with the approach line 13 of the base station 3.

Figure 5:
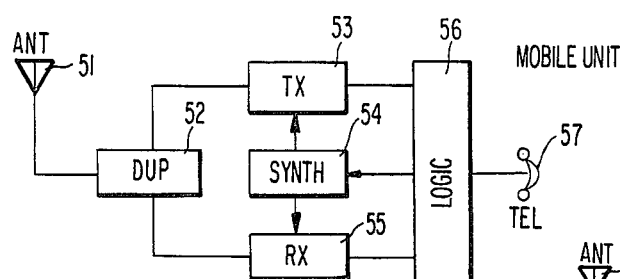
FIG. 5 is a block diagram of a mobile unit.

Next, will be described the structure and operation of the mobile unit illustrated in FIG. 5. It has an antenna 51, a duplexer 52, a frequency synthesizer 54, a transmitter and a receiver 55 both tuning in to the frequency synthesizer 54, a logic unit 56 capable of decoding data instructions from base stations and a handset 57. When the mobile unit, in the course of conversation over the channel CH11 in the small zone $Z(1)$, receives a channel switching signal over the channel CH11, as described above, in connection with its movement to another small zone, the logic unit 56 decodes this signal, assigns a new channel CH31 to the frequency synthesizer 54 and tunes in the transmitter 53 and the receiver 55 to the frequency of this new channel.

In this manner, the channel switching which is required in connection with the movement of the mobile unit 4 from the small zone Z(1) to the small zone (3) can be achieved without interrupting conversation. However, such a channel exchange system, as described above, is susceptible to errors including misconnections, because the channel exchange instruction is transmitted from a base station to the mobile unit over the previous channel (the channel CH11 in this example). Moreover, it also involves a disadvantage that every base station has to be provided with an expensive receiver which can tune in to every channel used in the system. For further details on this conventional system, reference is made to the aforementioned papers by T. Kamata et al. and T. Nagatsu et al.

Figure 2:
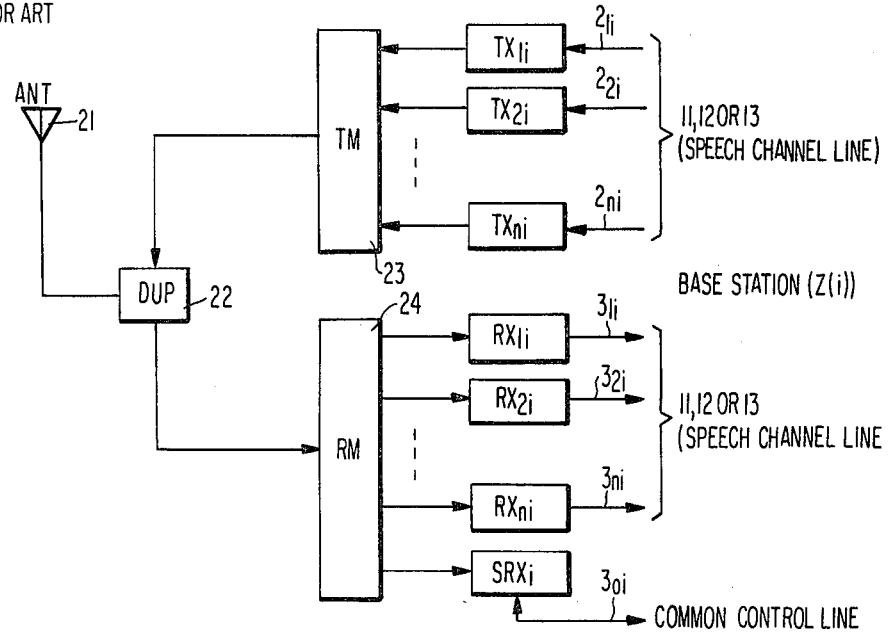
FIG. 2 is a block diagram of a base station of the prior art.
Figure 3:
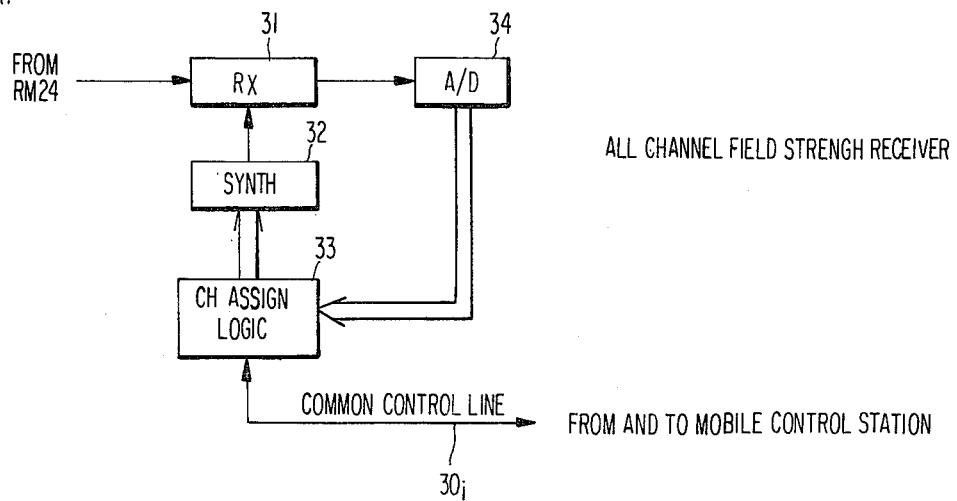
FIG. 3 is a block diagram of a conventional received carrier level measuring receiver.
Figure 6:
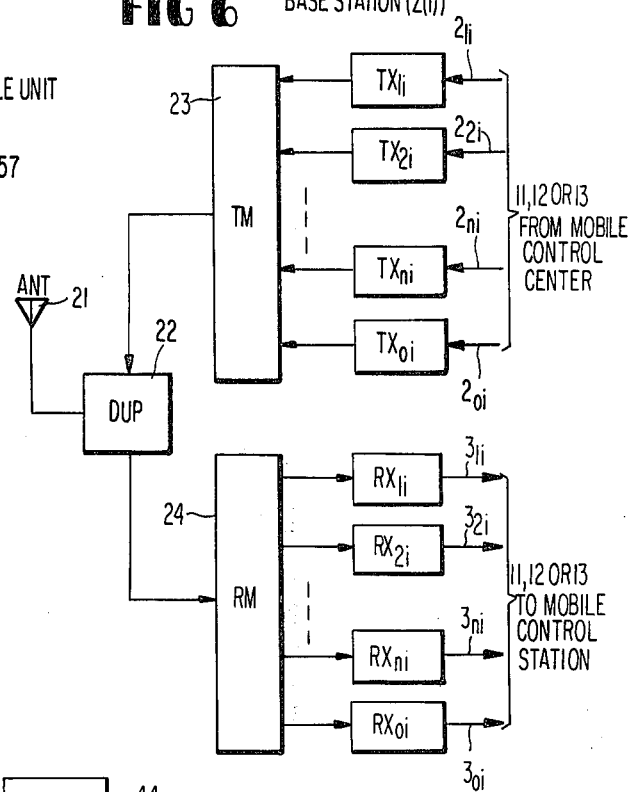
FIG. 6 is a block diagram of a radio base station according to this invention.

An embodiment of a base station in the channel exchange system of the present invention, which has solved these problems involved in the conventional system, is illustrated in FIG. 6. In this embodiment are provided a transmitter $TX_{oi}$ and a receiver $RX_{oi}$ ($i=1-3$) which are fixed to a certain channel (denominated CH00) in place of the all-channel received carrier level measuring receiver $SRX_i$ of the system illustrated in FIG. 2. The operating frequency of the transmitter $TX_{oi}$ and the receiver $RX_{oi}$ is common to the base stations 1-3. Components in FIG. 6 having the same functions as the corresponding ones in FIG. 2 are assigned respectively the same reference numbers as in FIG. 2. If the mobile unit is holding conversation over, for instance, the channel CH11 of the transmitter $TX_{11}$ and the receiver $RX_{11}$ of the small zone Z(1) when it moves from one small zone Z(1) to another, the receiver $RX_{11}$ will inform the mobile control station of the degradation in the quality of conversation. In the mobile control station illustrated in FIG. 7, components having the same functions as their counterparts in the conventional control station (FIG. 4) are assigned respectively the same reference numbers. In the control station shown in FIG. 7, a microprocessor 43 receives the information of degraded conversation quality transmitted from the base station 1 through speech path equipment 47 over the speech channel CH11 at step 82 (FIG. 8). The process then goes on to step 83, at which the microprocessor 43 instructs, under the program stored in ROM 44, the mobile unit to transmit its radio wave over the common channel CH00. That instruction is transmitted to mobile unit through a data transmitter 48 and the speech channel CH11, i.e., a connection line 21 and the base station transmitter TX11. The mobile unit can be the same type as the conventional unit illustrated in FIG. 5. An example of that mobile unit is disclosed in the paper "Mobile Unit for 800 MHz Band Land Mobile Telephone System," by M. Sakamoto et al, published in *Review of the Electrical Communication Laboratories Nippon Telegraph and Public Corporation*, Volume 25, Numbers 11-12, November-December, 1977. In response to said instruction, the logic unit 56 of the mobile unit tunes in the channel of the transmitter 53 to the channel CH00 and controls its radio wave to be transmitted over this channel for a prescribed period of time. The logic unit 56 can be composed of the logic unit shown in FIG. 16 of the above-noted Sakamoto publication.

The base stations 1-3 receive this radio wave from the mobile unit through their respective received carrier level measuring receivers $RX_{oi}$ ($i=1,2,3$) and transmit it to the mobile control station. The operations at the mobile control station after it has received the signals from the receivers $RX_{oi}$ are substantially the same as those in the conventional system. A field intensity comparator 42 compares the received carrier levels from these receivers $RX_{oi}$, selects the base station giving the highest level and informs the microprocessor 43 of the selection. The microprocessor 43 receives the selection information from the comparator 42 at step 84 of FIG. 8 and the process goes on to step 85, at which the microprocessor 43 reads out of the RAM 45 the number of data of an idle channel CH31, for example, among the channels assigned to the selected base station, under the program stored in ROM 44. Then, the microprocessor 43 supplies that number data to the data transmitter 48, which transmits this data to the transmitter $TX_{oi}$ of each radio base station through an approach line $2_{oi}$ (step 86 shown in FIG. 8). Said idle channel number data is then simultaneously transmitted from all the transmitters $TX_{oi}$ ($i=1,2,3$) to the mobile unit, whose frequency synthesizer, transmitter and receiver, upon reception of this number datum referring to the new channel, are tuned in to this new channel to complete the channel exchange. At the same time, the microprocessor 43 gives the voice path equipment 47 an instruction to replace the approach line 11 of the base station 1 with another approach line 13 of the base station 3, similarly to the conventional system previously described with reference to FIG. 4 (step 87 shown in FIG. 8).

As may be obvious from the description above, since a channel exchange signal in this invention is simultaneously transmitted over the same channel from all the small zones around the location of the mobile unit, the reception rate of the channel exchange signal in the overlapping area of the small zones is improved by the route diversity effect. There further is an economic advantage that, in a common channel system in which the same control channel is shared by plural base stations, the transmitters $TX_{oi}$ and the receivers $RX_{oi}$ can also be used for field strength measurement and channel assignment in setting up the circuit, but no special control channel is needed. The transmitters and receivers for channel exchange in this invention are less costly to manufacture than those of the conventional frequency synthesizer system.

What is claimed is:

1. A mobile telephone channel exchange system comprising a mobile unit or units each having a first transmitter-receiver capable of being tuned in to any given radio channel; a plurality of base stations each having (a) a group of transmitters each corresponding to one of plural radio channels, (b) a group of receivers each provided with means for detecting any drop in received carrier level below a predetermined value and corresponding to one of said plural radio channels, and (c) a small zone; a telephone exchange connected to ordinary telephone subscribers, and a mobile control station connected between said plurality of base stations and said telephone exchange for controlling telephone circuits, and for switching over from a first radio channel of a first of said base stations to a second radio channel which is one of idle channels of a second of said base stations when any of said mobile units, while having conversation on said first radio channel, moves from the small zone of said first base station to the small zone of said second base station, characterized in that each of said plural base stations includes a second transmitter-receiver corresponding to a common radio channel separate from the radio channels of said plurality of base stations; means responsive to first exchange instructions data for switching over from said first radio channel to said common radio channel; and means responsive to second exchange instruction data for switching over from said first radio channel to said second radio channel, and that said mobile control station includes means for producing said first exchange instruction data in response to the output of said detecting means; means for comparing the carrier levels transferred from said mobile unit received by a second group of receivers of said plurality of base stations to select out of the idle channels of said second base station said second radio channel having the highest level and produce said second exchange instruction data corresponding to said second radio channel; means responsive to said second exchange instruction data for switching over said telephone circuit from said first radio channel to said second radio channel; and means for transmitting said first and second exchange instruction data to said mobile unit by way of said second transmitters of said plural base stations.

* * * * *

UNITED STATES PATENT AND TRADEMARK OFFICE
CERTIFICATE OF CORRECTION

PATENT NO. : 4,308,429

DATED : December 29, 1981

INVENTOR(S) : Tomokazu KAI et al.

It is certified that error appears in the above—identified patent and that said Letters Patent is hereby corrected as shown below:

Column 3, line 18, delete "from" and insert -- form -- ;

line 61, delete "(" before "CH11" ;

line 65, delete "convention" and insert -- conversation -- .

Column 4, line 60, after "ter" insert -- 53 -- .

Signed and Sealed this

Twenty-second Day of June 1982

[SEAL]

Attest:

Attesting Officer

GERALD J. MOSSINGHOFF

Commissioner of Patents and Trademarks